(12) United States Patent
Prevratil et al.

(10) Patent No.: US 10,895,694 B2
(45) Date of Patent: Jan. 19, 2021

(54) CABLE RETENTION COUPLERS AND RELATED METHODS

(71) Applicant: CORNING RESEARCH & DEVELOPMENT CORPORATION, Corning, NY (US)

(72) Inventors: Karyne Poissant Prevratil, Fort Worth, TX (US); Diana Rodriguez, Fort Worth, TX (US)

(73) Assignee: Corning Research & Development Corporation, Corning, NY (US)

( * ) Notice: Subject to any disclaimer, the term of this patent is extended or adjusted under 35 U.S.C. 154(b) by 0 days.

(21) Appl. No.: 16/844,189

(22) Filed: Apr. 9, 2020

(65) Prior Publication Data

US 2020/0233152 A1 Jul. 23, 2020

Related U.S. Application Data

(63) Continuation of application No. PCT/US2018/056299, filed on Oct. 17, 2018.

(60) Provisional application No. 62/573,381, filed on Oct. 17, 2017.

(51) Int. Cl.
| | |
|---|---|
| *G02B 6/36* | (2006.01) |
| *G02B 6/42* | (2006.01) |
| *G02B 6/38* | (2006.01) |
| *G02B 6/44* | (2006.01) |

(52) U.S. Cl.
CPC ......... *G02B 6/3628* (2013.01); *G02B 6/3825* (2013.01); *G02B 6/4284* (2013.01); *G02B 6/4452* (2013.01); *G02B 6/4455* (2013.01)

(58) Field of Classification Search
CPC ............... G02B 6/36; G02B 6/42; G02B 6/38
USPC .......................................................... 385/39
See application file for complete search history.

(56) References Cited

U.S. PATENT DOCUMENTS

| | | | | |
|---|---|---|---|---|
| 4,911,514 A | * | 3/1990 | Okada ................. | G02B 6/2808 385/39 |
| 5,181,044 A | * | 1/1993 | Matsumoto .......... | H01Q 1/3275 343/700 MS |
| 5,742,982 A | * | 4/1998 | Dodd ..................... | F16G 11/00 24/16 R |

(Continued)

OTHER PUBLICATIONS

Panduit Quick Release Brackets—Cable Strain Relief Brackets; CDW People Who Get It; Downloaded Apr. 16, 2020; 1 Page.

(Continued)

*Primary Examiner* — Kaveh C Kianni
(74) *Attorney, Agent, or Firm* — Grant A. Gildehaus (57) ABSTRACT

A retention assembly for coupling a cable including a plurality of optical fibers to a support may include a retention anchor configured to be coupled to a support and a retention coupler configured to be coupled to a cable. The retention anchor may include a mounting plate configured to be coupled to a support and defining an entry hole extending through the mounting plate and an engagement slot extending from a periphery of the entry hole. The retention coupler may include a retention support and a retainer blade coupled to a first coupler face of the retention support via an extension. The retainer blade may be configured to be passed through the entry hole, such that the extension extends through the entry hole of the mounting plate, and the extension slides within the engagement slot of the mounting plate.

7 Claims, 4 Drawing Sheets

(56) References Cited

U.S. PATENT DOCUMENTS

| | | | | |
|---|---|---|---|---|
| 8,213,761 | B2* | 7/2012 | Gronvall | G02B 6/4471 |
| | | | | 385/135 |
| 8,953,924 | B2* | 2/2015 | Cote | G02B 6/4471 |
| | | | | 385/137 |
| 9,140,870 | B2* | 9/2015 | Marmon | G02B 6/4454 |
| 9,746,633 | B2 | 8/2017 | Segsworth et al. | |
| 9,791,653 | B2* | 10/2017 | Aznag | G02B 6/4444 |
| 10,473,873 | B2* | 11/2019 | Diepstraten | G02B 6/445 |
| 2002/0181921 | A1 | 12/2002 | Daoud et al. | |
| 2005/0271344 | A1* | 12/2005 | Grubish | G02B 6/445 |
| | | | | 385/135 |
| 2006/0032659 | A1* | 2/2006 | Allen | H02G 3/105 |
| | | | | 174/92 |
| 2006/0034578 | A1* | 2/2006 | Allen | H01L 29/49 |
| | | | | 385/135 |
| 2008/0298764 | A1* | 12/2008 | Bloodworth | G02B 6/4452 |
| | | | | 385/135 |
| 2010/0092147 | A1* | 4/2010 | Desard | G02B 6/4477 |
| | | | | 385/135 |
| 2012/0230646 | A1* | 9/2012 | Thompson | G02B 6/3887 |
| | | | | 385/135 |
| 2014/0079366 | A1* | 3/2014 | Rodriguez | G02B 6/36 |
| | | | | 385/136 |
| 2014/0314388 | A1* | 10/2014 | Alaerts | G02B 6/4471 |
| | | | | 385/135 |
| 2017/0059060 | A1* | 3/2017 | Gallion | H02G 3/32 |

OTHER PUBLICATIONS

International Search Report and Written Opinion of the International Searching Authority; PCT/US2018/056299; dated Dec. 20, 2018; 9 Pages; ISA/US Commissioner for Patents.

* cited by examiner

CABLE RETENTION COUPLERS AND RELATED METHODS

PRIORITY APPLICATIONS

This application is a continuation of International Application No. PCT/US18/56299, filed on Oct. 17, 2018, which claims the benefit of priority to U.S. Provisional Application No. 62/573,381, filed Oct. 17, 2017, both applications being incorporated herein by reference.

BACKGROUND

This disclosure relates to retention couplers for coupling a cable to a support, and more particularly, to retention couplers and related methods for coupling a cable including optical fibers to a support.

It is often desirable to splice the ends of one or more optical fibers of a first cable to the ends of one or more optical fibers of a second cable. For example, cables including optical fibers may be used to communicate information from a source to one or more devices. Some cables may be routed through the environment to a building and enter the building through one or more ducts. The interior of the building may include an internal communication network including one or more cables including optical fibers. The optical fibers from exterior to the building may be spliced to optical fibers in the interior of the building to link the communication from the source to the communication network in the interior of the building.

A splice enclosure may be provided for providing a space for receipt of many spliced optical fibers of cables. For example, one or more cables including optical fibers may be routed into the splice enclosure, optical fibers of the cables may be spliced, and the spliced fibers may be placed in splice trays. Splicing the optical fibers to one another is often tedious and time consuming, often resulting in significant expense. In addition, as data communication increases and the number of optical fibers grows to accommodate the increase, more optical fibers may be routed into splice enclosures. As a result, organizing and routing the cables and optical fibers into and within the splice enclosure may become problematic, resulting in increased time and difficulty with performing splicing operations.

Some examples described herein may address one or more possible drawbacks associated with increasing the additional optical fibers and routing the cables and/or optical fibers into and within a splice enclosure.

SUMMARY

According to a first aspect, the present disclosure is generally directed to a retention assembly for coupling a cable including a plurality of optical fibers to a support. The retention assembly may include a retention anchor configured to be coupled to a support. The retention anchor may include a mounting plate configured to be coupled to a support.

The mounting plate may define a first face, a second face opposite the first face, and an entry hole extending through the mounting plate from the first face to the second face. The mounting plate may also include an engagement slot extending from a periphery of the entry hole. The retention assembly may also include a retention coupler configured to be coupled to a cable including a plurality of optical fibers. The retention coupler may include a retention support defining a first coupler face and a second coupler face opposite the first coupler face, and a retainer blade coupled to the first coupler face of the retention support via an extension. The retention coupler may also include an engagement surface associated with the second coupler face and configured to be adjacent a cable including a plurality of optical fibers. The retainer blade may be configured to be passed through the entry hole, such that the extension extends through the entry hole from the first face to the second face of the mounting plate. The extension may be configured to slide within the engagement slot of the mounting plate, such that the retainer blade is adjacent the second face of the mounting plate, and the first coupler face of the retention support is adjacent the first face of the mounting plate.

According to a further aspect, this disclosure is also generally directed to a retention coupler for coupling a cable including a plurality of optical fibers to a support. The retention coupler may include a retention support defining a first coupler face and a second coupler face opposite the first coupler face. The retention coupler may also include a retainer blade coupled to the first coupler face of the retention support via an extension. The retainer blade may include a catch element at an end of the extension remote from the first coupler face. The catch element may be shaped and sized to fit through an entry hole in a mounting plate. The retention coupler may also include an engagement surface associated with the second coupler face and configured to be adjacent a cable including a plurality of optical fibers. The catch element of the retainer blade may be configured to be passed through the entry hole, such that the extension extends through the entry hole. The extension may be configured to slide within an engagement slot in the mounting plate extending from the entry hole, such that the retainer blade is adjacent a first face of the mounting plate and the first coupler face of the retention support is adjacent another face of the mounting plate opposite the first face of the mounting plate.

According to another aspect, this disclosure is also generally directed to a method for coupling a cable including a plurality of optical fibers to a support. The method may include coupling the cable to a retention coupler. The retention coupler may include a retention support defining a first coupler face and a second coupler face opposite the first coupler face, and a retainer blade coupled to the first coupler face of the retention support via an extension. The retainer blade may include a catch element at an end of the extension remote from the first coupler face. The catch element may be shaped and sized to fit through an entry hole in a mounting plate. The method may further include passing the catch element through an entry hole in a mounting plate and sliding the extension into an engagement slot in the mounting plate extending from the entry hole, such that the retainer blade is adjacent a first face of the mounting plate and the first coupler face of the retention support is adjacent another face of the mounting plate opposite the first face of the mounting plate.

DETAILED DESCRIPTION

Reference will now be made in detail to embodiments, examples of which are illustrated in the accompanying drawings. Whenever possible, the same reference numbers are used throughout the drawings to refer to the same or like parts.

This disclosure is generally directed to retention couplers for coupling a cable to a support and related methods. For example, cables including optical fibers may be used to communicate information from a communication source to one or more devices. Such cables may be routed through the environment to a building or between buildings (e.g., data center buildings) via ducts and enter a building through one or more ducts. As noted above, the interior of the building may include an internal communication network including one or more cables including optical fibers. The optical fibers from exterior to the building may be spliced to optical fibers in the interior of the building to link the communication from a communication source to the communication network in the interior of the building. In some examples, the cables exterior to the building may have different requirements than requirements of the cables inside the building. For example, cables inside a building may need to comply with fire codes and/or other regulations, while cables exterior to the building may not need to comply with such codes and/or other regulations.

A splice enclosure may be provided for providing a space for receipt of many spliced optical fibers of cables. For example, one or more cables including optical fibers may be routed into the splice enclosure, optical fibers of the cables may be spliced, and the spliced fibers may be placed in splice trays. The number of optical fibers in cables has tended to increase to accommodate an increased demand in data communication. Thus, the number of cables and/or the number of optical fibers in the cables routed into a splice enclosure has also increased. As a result, it may be desirable to improve the organization and routing of the cables and/or optical fibers into splice enclosures so that performing splicing operations and service-related tasks may be completed more quickly and efficiently. Some examples of retention couplers and related methods described herein may reduce time for performing splicing and service-related operations and/or improve the efficiency of such operations.

In some examples, the retention couplers and related methods described herein may be configured to facilitate splicing of one or more higher fiber-count cables, such as, for example, 1728 fiber-count cables, 3456 fiber-count cables, and/or 6912 fiber-count cables. In some examples, one or more of the cables may be ribbon cables, for example, having optical fibers arranged adjacent to other optical fibers of the cables, such that the adjacent optical fibers are arranged substantially along a line forming a substantially flat ribbon including a plurality of optical fibers. In some examples, the cables may not be ribbon cables. Some examples of retention couplers and related methods described herein may assist with facilitating the splicing of additional optical fibers in an efficient manner. Splicing for different purposes and/or different types of optical fibers is/are contemplated.

Figure 1:
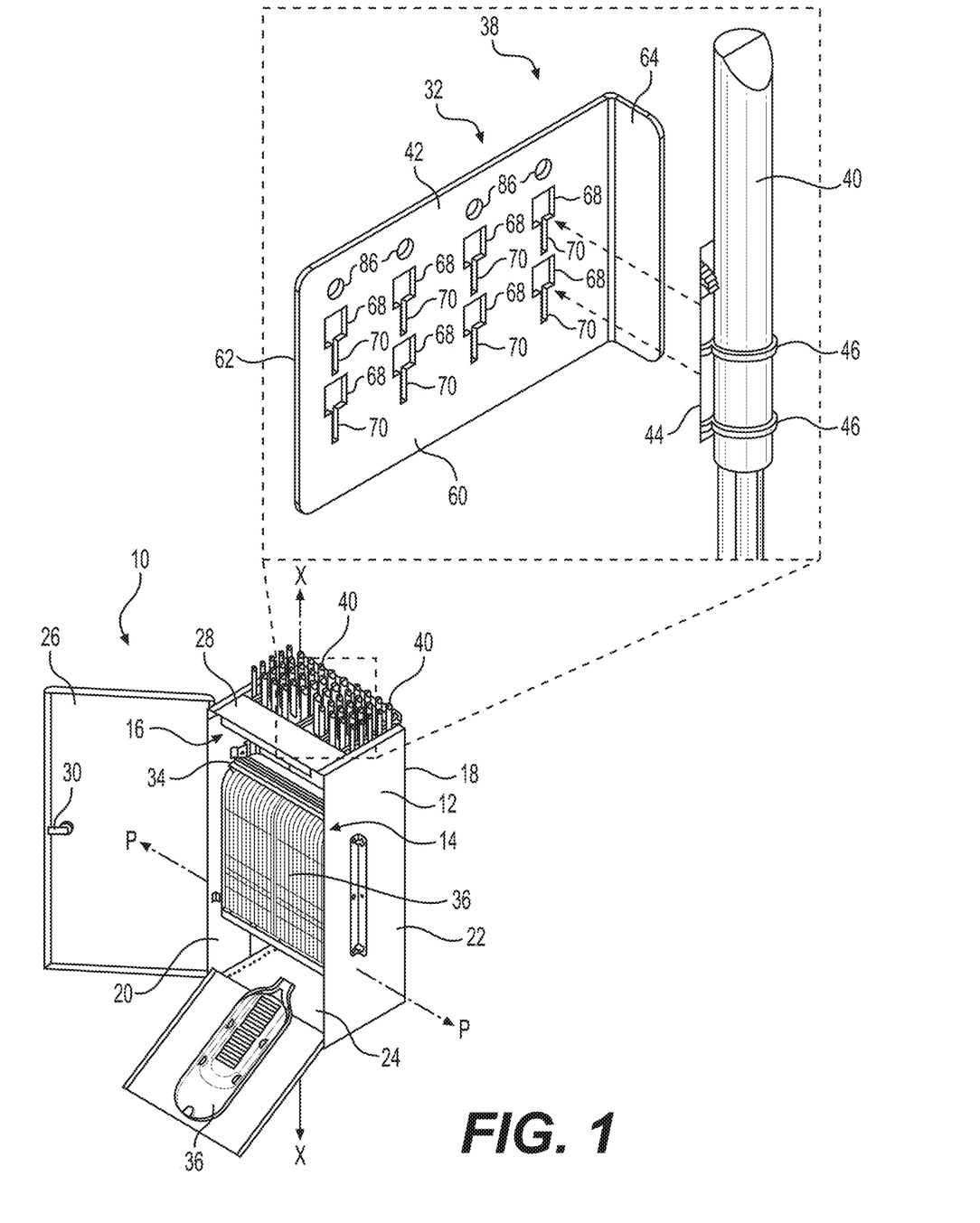
FIG. 1 is a schematic perspective view of an example splice enclosure including an example retention assembly for coupling a cable including a plurality of optical fibers to a support.

FIG. 1 is a schematic perspective view of an example splice enclosure 10 including an example cabinet 12 and an example splice tray assembly 14. In the example shown, the cabinet 12 defines an interior volume 16 and includes a rear wall 18, a first side wall 20 coupled to the rear wall 18, and a second side wall 22 coupled to the rear wall 18 and spaced from the first side wall 20. The example cabinet 12 shown in FIG. 1 also includes a lower wall 24 coupled to the first side wall 20, the second side wall 22, and/or the rear wall 18. In some examples, the lower wall 24 may include knock-outs and/or other structures (e.g., openings) for mounting the cabinet 12 to a support (e.g., a floor or platform) and/or to provide one or more entry points for one of more cables to pass from exterior to the cabinet 12 to the interior volume 16 of the cabinet 12. The example cabinet 12 also includes a front panel 26 coupled to the first side wall 20 and configured to pivot with respect to the first side wall 20. For example, the front panel 26 may serve as a door to gain access to the interior volume 16 of the cabinet 12 and may be mounted on hinges to support the front panel 26 and permit pivoting of the front panel 26 relative to the remainder of the cabinet 12. The example cabinet 12 also includes an upper wall 28 coupled to one or more of the first side wall 20, the second side wall 22, and/or the rear wall 18. In some examples, the upper wall 28, or at least a portion thereof, may be removably coupled to the first side wall 20, the second side wall 22, and/or the rear wall 18, which may render it relatively easier for a technician routing the cables to access the cables as they are routed into the cabinet 12. In some examples, the upper wall 28 may include knock-outs and/or other structures (e.g., openings) for providing one or more entry points for one of more cables to pass from exterior to the cabinet 12 to the interior volume 16 of the cabinet 12, for example, as described herein. As shown, the cabinet 12 may define a longitudinal axis X extending in a direction substantially parallel to planes in which the rear wall 18 and at least one of the first wall 20 or the second wall 22 lie. Although the terms "rear," "side," "front," "lower," and "upper" have been used for clarity and describing relative relationships among parts, the use of these terms is not intended to be absolute.

As shown in FIG. 1, the cabinet 12 may also include a latch 30 coupled to the front panel 26 and a catch coupled to the second wall 22 and configured to selectively secure the front panel 26 in the closed position. Some examples of the splice enclosure 10 may include one or more mounting brackets (e.g., coupled to rear wall 18) configured to couple the splice enclosure 10 to a support, such as, for example, a rack or a wall or support of the building in which the splice enclosure 10 is present.

Figure 2:
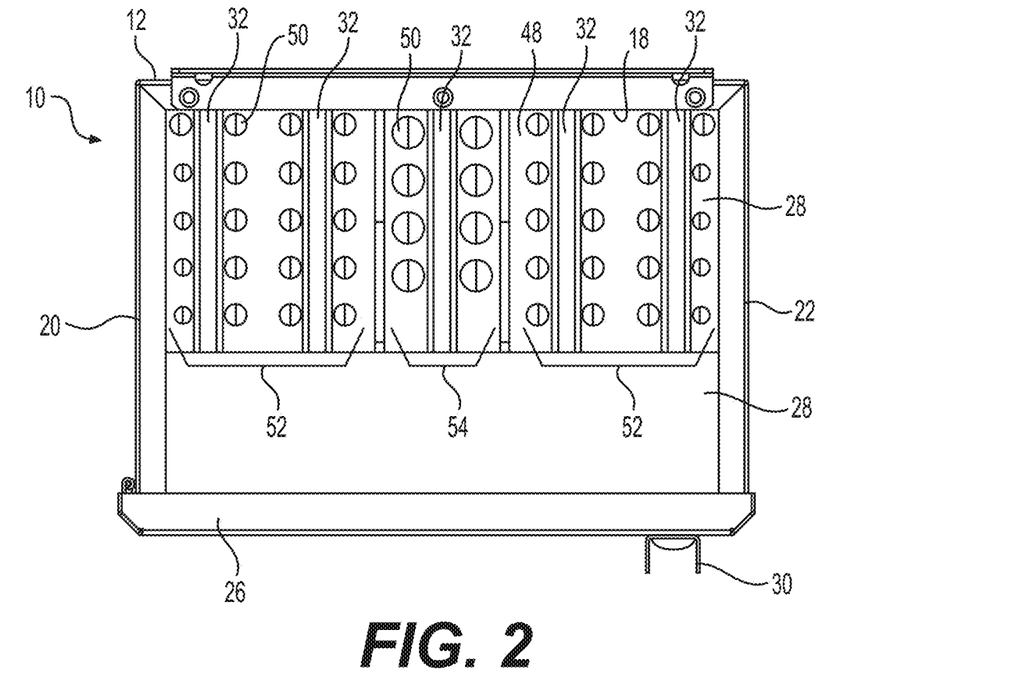
FIG. 2 is a schematic top view of an example splice enclosure showing an example upper wall.
Figure 3:
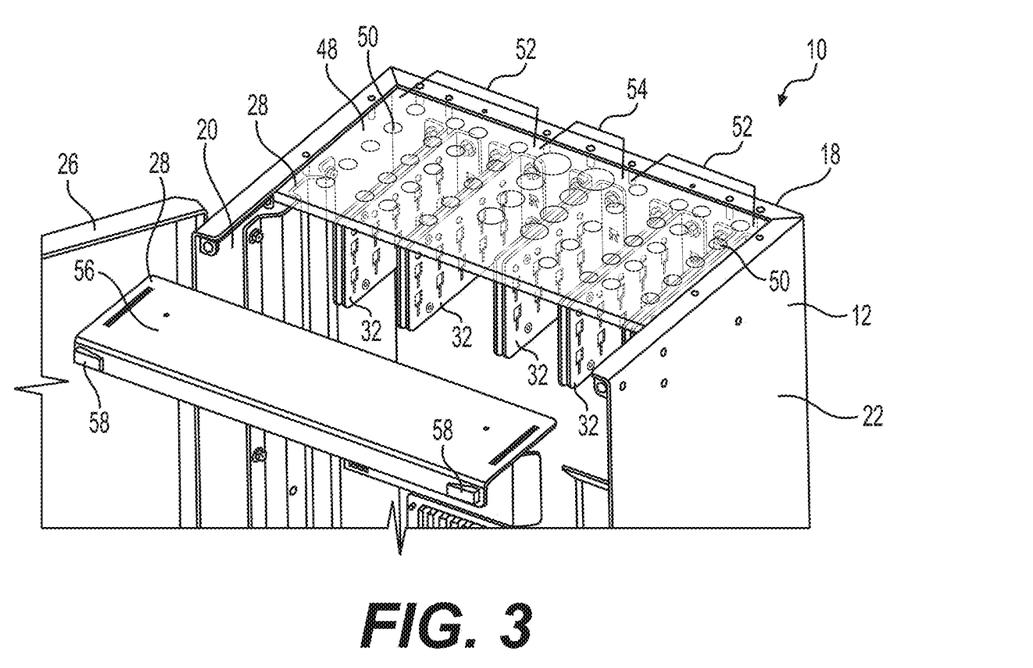
FIG. 3 is a schematic perspective view of an upper portion of an example splice enclosure including an example portion of the upper wall removed from the upper portion of the splice enclosure.

As shown in FIGS. 1-3, some examples of the splice enclosure 10 may also include one or more retention anchors 32 coupled to the cabinet 12 at an end of the cabinet 12 remote from the lower wall 24. For example, the one or more retention anchors 32 may be coupled to the rear wall 18, for example, via at least one of one or more fasteners, welding, or adhesives.

As shown in FIG. 1, the example splice enclosure 12 includes a splice tray assembly 14. In the examples shown, the splice tray assembly 14 includes a splice tray housing 34 coupled to the cabinet 12 and a plurality of splice trays 36 coupled to the splice tray housing 34 and configured to provide a space for receipt of a plurality of spliced optical fibers of a plurality of cables. In some examples, the splice tray housing 34 may be pivotally coupled to the cabinet 12, such that the splice tray housing 34 pivots about a housing pivot axis P extending in a direction substantially perpendicular with respect to the longitudinal axis X, for example, substantially parallel with respect to a plane in which the rear wall 18 lies. Such pivoting may render it relatively easier for a technician to gain access to one or more of the splice trays 36. As shown in FIG. 1, in some examples, one or more of the splice trays 36 may be independently movable, pivotable, and/or removable relative to the splice tray assembly 14 to provide ease of access to splices within the splice trays 36.

As shown in FIG. 1, a retention assembly 38 may be provided for coupling a cable 40 including a plurality of optical fibers to a support. In the examples shown in FIG. 1, the retention assembly 38 includes the retention anchor 32, which may be configured to be coupled to the rear wall 18 of the cabinet 12. In some examples, the retention anchor 32 may include a mounting plate 42 configured to be coupled to a support (e.g., the rear wall 18 of the cabinet 12). In some examples, the retention assembly 38 may also include a retention coupler 44 configured to be coupled to a cable 40, for example, including a plurality of optical fibers. In the example shown in FIG. 1, the retention assembly 38 also includes one or more cable-ties 46 coupling the retention coupler 44 to the cable 40, and the retention coupler 44 is configured to be coupled to the retention anchor 32 resulting in the coupling of the cable 40 to the retention anchor 32, as described in more detail herein with respect to FIGS. 4 and 5.

FIG. 2 is a schematic top view of an example splice enclosure 10 showing an example upper wall 28, and FIG. 3 is a schematic perspective view of an upper portion of an example splice enclosure 10 including an example portion of the upper wall 28 removed from the upper portion of the splice enclosure 10. As shown in FIGS. 2 and 3, the example upper wall 28 may include an entry plate 48 including a plurality of apertures 50 for receiving one or more cables 40 and/or one or more optical fibers to facilitate passage of the cables 40 and/or optical fibers into and out of the splice enclosure 10. For example, the apertures 50 may include exterior apertures 52 for receiving exterior cables, for example, from exterior the building, so that the exterior cables may be routed into the cabinet 12. The apertures 50 may also include interior apertures 54 for receiving interior cables, for example, from the interior of the building, so that the interior cables may be routed into the cabinet 12 for splicing with the exterior cables. The apertures 50, including the exterior apertures 52 and/or the interior apertures 54 may be configured to receive the same types of cables or types of cables different than the exterior cables and/or the interior cables.

In some examples, for example, as shown in FIGS. 2 and 3, the upper wall 28 may include a removable portion 56 configured to be removably coupled to at least one of the first side wall 20, the second side wall 22, or the rear wall 18. For example, the removable portion 56 may include panel latches 58 at opposite ends of the removable portion 56 and configured to permit the removable portion 56 to be selectively separated from and coupled to the cabinet 12. This may provide a technician with relatively improved access to an upper portion of the interior volume 16 of the cabinet 12, for example, when installing cables and/or optical fibers and/or performing a splicing operation.

Figure 4:
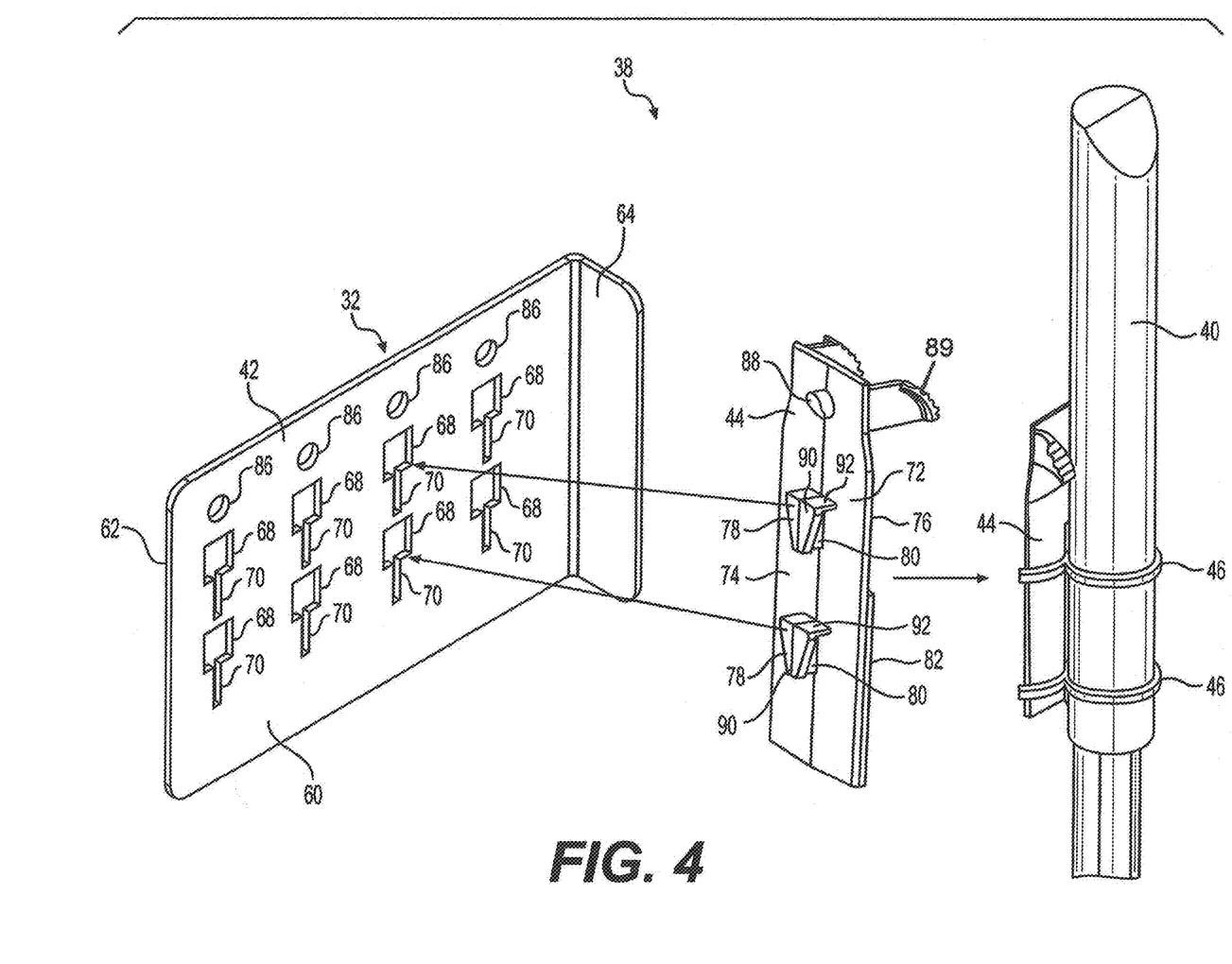
FIG. 4 is a schematic perspective assembly view of an example retention assembly for coupling a cable including a plurality of optical fibers to a support.
Figure 5:
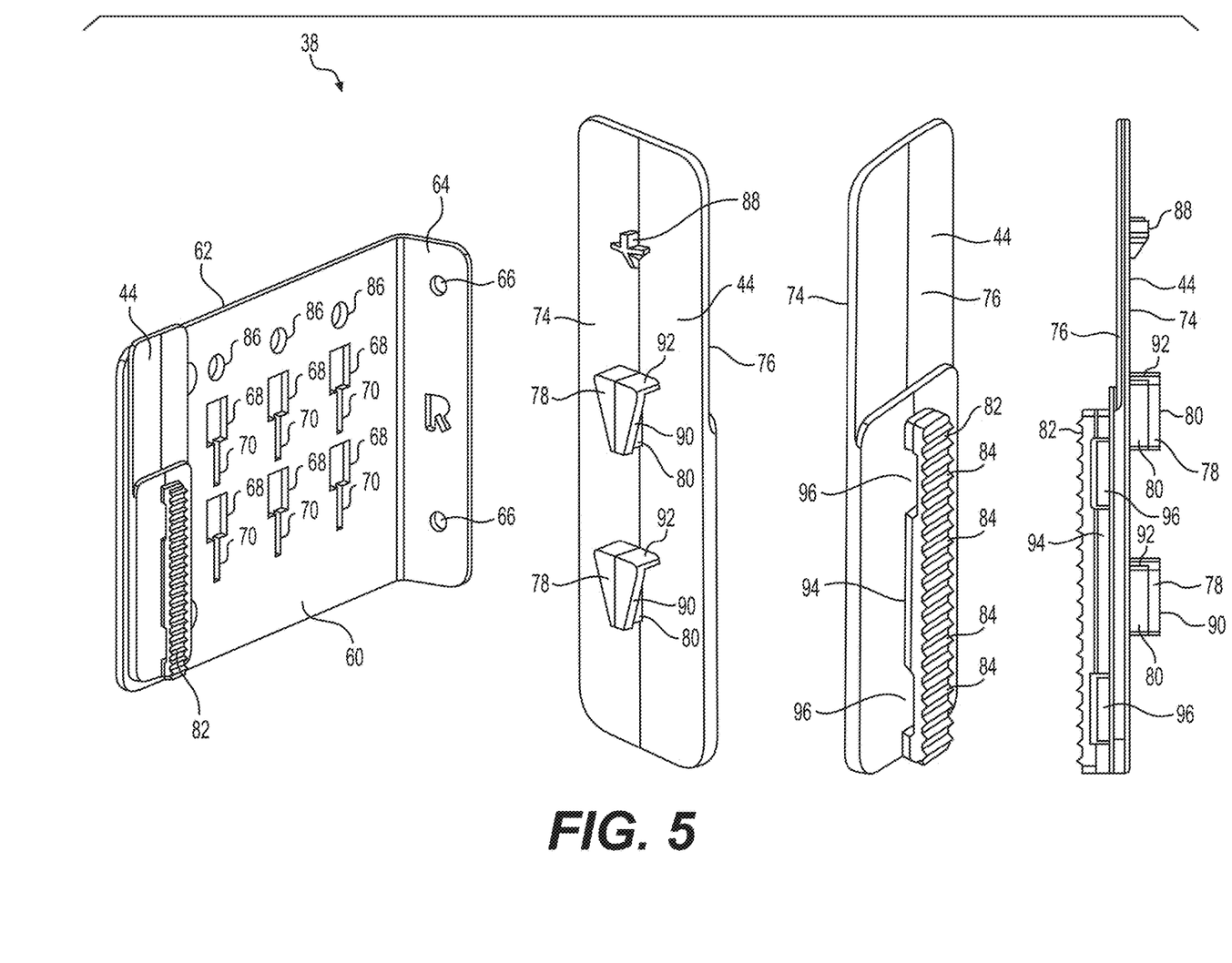
FIG. 5 shows a schematic perspective view of an example retention anchor and schematic views of an example retention coupler for coupling a cable including a plurality of optical fibers to a support.

FIG. 4 shows an example retention assembly 38 for coupling a cable 40 including a plurality of optical fibers to a support, such as, for example, the cabinet 12 shown in FIG. 1. In the example shown, the retention assembly 38 includes a retention anchor 32 configured to be coupled to a support. In some examples, the retention anchor 32 may include a mounting plate 42 configured to be coupled to a support, and the mounting plate 42 may define a first face 60 and a second face 62 opposite the first face 60. In some examples, the retention anchor 32 may also include a flange 64 extending substantially perpendicular with respect to the first face 60 and/or the second face 62, and the flange 64 may be configured to couple the retention anchor 32 to the support. In some examples, for example as shown in FIG. 5, the flange 64 may include one or more holes 66 configured to receive fasteners for coupling the flange 64 to the support. The flange 64 may be coupled to the support via one or more fasteners, adhesives, and/or welding.

As shown in FIGS. 4 and 5, mounting plate 42 may define one or more entry holes 68 extending through the mounting plate 42 from the first face 60 to the second face 62, and an engagement slot 70 extending from a periphery of one or more of the entry holes 68. For example, as shown in FIGS. 4 and 5, the example engagement slots 70 extend downward from a lower edge of each of the entry holes 68.

As shown in FIGS. 4 and 5, the example retention assembly 38 may also include a retention coupler 44 configured to be coupled to a cable 40 including a plurality of optical fibers. In the examples shown in FIGS. 4 and 5, the retention coupler 44 may include a retention support 72 defining a first coupler face 74 and a second coupler face 76 opposite the first coupler face 74. The retention coupler 44 may also include one or more retainer blades 78 coupled to the first coupler face 74 of the retention support 72 via an extension 80, and an engagement surface 82 associated with the second coupler face 76 and configured to be adjacent a cable 40. As shown in FIG. 5, some examples of the engagement surface 82 may include a plurality of ribs 84 configured to prevent a cable 40 from sliding relative to the engagement surface 82, for example, after a cable-tie 46 is tightened around the cable 40 and the retention coupler 44, for example, as described herein. In the examples shown in FIGS. 4 and 5, the retainer blade 78 is configured to be passed through a corresponding entry hole 68 in the mounting plate 42, such that the extension 80 associated with the retainer blade 78 extends through the entry hole 68 from the first face 60 to the second face 62 of the mounting plate 42. In the examples shown in FIGS. 4 and 5, the extension 80 is configured to slide within the engagement slot 70 associated with the entry hole 68 of the mounting plate 42, such that the retainer blade 78 is adjacent the second face 62 of the mounting plate 42 and the first coupler face 74 of the retention support 72 of the retention coupler 44 is adjacent the first face 60 of the mounting plate 42.

As shown in FIGS. 4 and 5, the mounting plate 42 may include more than one entry hole 68 and corresponding engagement slot 70. For example, the mounting plate 42 may include one or more substantially vertically-aligned pairs of entry holes 68 and engagement slots 70. In addition, the retention coupler 44 may include more than one retainer blade 78 (e.g., two retainer blades 78) and corresponding extension 80, for example, as shown in FIGS. 4 and 5.

As shown in FIGS. 4 and 5, some examples of the mounting plate 42 may define one or more latch holes 86, and the retention coupler 44 may include a latch member 88 associated with the first coupler face 74 of the retention coupler 44. In such examples, the latch member 88 may extend from the first coupler face 74 and may be configured to engage the latch hole 86 of the mounting plate 42. In some examples, this may provide a snap-fitting engagement, as the retainer blade 78 of the retention coupler 44 slides down the engagement slot 70 and into its intended position. This may help a technician determine when the retention coupler 44 is properly engaged with the mounting plate 42. In some examples, the latch member 88 defines a lateral surface configured to engage an edge of the latch hole 86 and prevent the extension 80 from sliding out of the engagement slot 70 once the latch member 88 is received in the latch hole 86. In some such examples, the retention support 72 of the retention coupler 44 may be configured to be flexed, so that the latch member 88 is separated from the latch hole 86, thereby permitting the extension 80 to slide within (e.g., and up) the engagement slot 70 until the retainer blade 78 can be withdrawn from its corresponding entry hole 68. For example, the retention coupler 44 may include a grip element 89 extending from the second coupler face 76 opposite the latch member 88. Pulling or pivoting the grip element, by a technician, may cause flexion of the retention support 72, such that the latch member 88 disengages from the latch hole 86 enabling the extension 80 to slide within the engagement slot 70.

In some examples, the retainer blade 78 may include a catch element 90 at an end of the extension 80 remote from the first coupler face 74, for example, as shown in FIGS. 4 and 5. In some examples, the catch element 90 may shaped and/or sized to pass through the entry hole 68, but not through the engagement slot 70, thereby maintaining engagement between the retainer blade 78 of the retention coupler 44 and mounting plate 42 of the retention anchor 32. In the examples shown in FIGS. 4 and 5, the catch element 90 has a substantially triangular cross-section and is sized to fit through the example entry holes 68 shown in FIGS. 4 and 5, which are substantially rectangular. Catch elements 90 having a cross-section other than substantially triangular are contemplated, and entry holes 68 having shapes other than substantially rectangular are contemplated.

In some examples, the retainer blade 78 may include a stop element 92 configured to engage an edge of a corresponding entry hole 68 and prevent the extension 80 associated with the retainer blade 78 from sliding farther (e.g., down) into the engagement slot 70 than intended, for example, as shown in FIGS. 4 and 5.

As shown in FIG. 5, the retention coupler 44, in some examples, may include a projection 94 extending from the second coupler face 76 and having remote end coupled to the engagement surface 82. In some examples, the projection 94 defines one or more slots 96 configured to receive a cable-tie 46 for coupling a cable 40 to the retention coupler 44. For example, the retention assembly 38 may include one or more cable-ties 46 extending around a cable 40 (see, e.g., FIG. 4) and passing through the one or more slots 96 of the retention coupler 44 (see, e.g., FIG. 5).

As explained herein, the retention assembly 38, according to some examples, may be used in a method for coupling a cable including a plurality of optical fibers to a support, such as, for example, a panel or wall of a splice enclosure cabinet. For example, such a method may include coupling the cable to a retention coupler that includes a retention support defining a first coupler face and a second coupler face opposite the first coupler face, and a retainer blade coupled to the first coupler face of the retention support via an extension. The retainer blade, in some examples, may include a catch element at an end of the extension remote from the first coupler face, and the catch element may be shaped and/or sized to fit through an entry hole in a mounting plate. The method may include passing the catch element through an entry hole in a mounting plate and sliding the extension into an engagement slot in the mounting plate extending from the entry hole, such that the retainer blade is adjacent a first face of the mounting plate and the first coupler face of the retention support is adjacent another face of the mounting plate opposite the first face of the mounting plate. Some examples of the method may also include coupling the mounting plate to a support, such as, for example, a panel or wall of a splice enclosure cabinet. In some examples, the mounting plate may be coupled to the support prior to passing the catch element through the entry hole in the mounting plate. In some examples, coupling the cable to the retention coupler may include passing a cable-tie through a slot in the retention coupler and around the cable, and cinching the cable-tie tightly around the cable. In some examples of the method, sliding the extension into the engagement slot in the mounting plate may include sliding the extension into the engagement slot until a latch member extending from the first coupler face of the retention coupler engages a latch hole in the mounting plate. In some examples of the method, sliding the extension into the engagement slot in the mounting plate may include sliding the extension into the engagement slot until a stop element associated with the retainer blade engages an edge of the entry hole and prevents the extension from sliding farther into the engagement slot.

Some examples of the retention couplers and related methods described herein may result in facilitating coupling of cables to a splice enclosure in a secure manner without the need for use of tools. Some examples may provide an ability to easily install and/or remove the retention couplers, in some instances, repeatedly. Some examples may render it relatively easy to attach one or more cable-ties for coupling a cable to the retention coupler. In some examples, the retention coupler may be configured to provide a positive snap-fit engagement with a mounting plate, thereby enabling a technician to more easily determine that a cable has been securely coupled to the mounting plate.

Although this subject matter has been described in language specific to structural features and/or methodological acts, it is to be understood that the subject matter defined in the appended claims is not necessarily limited to the specific features or acts described.

Rather, the specific features and acts are disclosed as illustrative forms of implementing the claims.

Example Clauses

A. An example retention assembly for coupling a cable comprising a plurality of optical fibers to a support, the retention assembly comprising:

a retention anchor configured to be coupled to a support, the retention anchor comprising:

a mounting plate configured to be coupled to a support, the mounting plate defining:

a first face;

a second face opposite the first face;

an entry hole extending through the mounting plate from the first face to the second face; and     an engagement slot extending from a periphery of the entry hole; and a retention coupler configured to be coupled to a cable comprising a plurality of optical fibers, the retention coupler comprising:

a retention support defining a first coupler face and a second coupler face opposite the first coupler face;

a retainer blade coupled to the first coupler face of the retention support via an extension; and an engagement surface associated with the second coupler face and configured to be adjacent a cable comprising a plurality of optical fibers, wherein the retainer blade is configured to be passed through the entry hole, such that the extension extends through the entry hole from the first face to the second face of the mounting plate, and wherein the extension is configured to slide within the engagement slot of the mounting plate, such that the retainer blade is adjacent the second face of the mounting plate and the first coupler face of the retention support is adjacent the first face of the mounting plate.

B. The retention assembly of example A, wherein the mounting plate further defines a latch hole, and wherein the retention coupler comprises a latch member extending from the first coupler face and configured to engage the latch hole of the mounting plate.

C. The retention assembly of example A or example B, wherein the latch member defines a lateral surface configured to engage an edge of the latch hole and prevent the extension from sliding out of the engagement slot once the latch member is received in the latch hole.

D. The retention assembly of any one of example A through example C, wherein retainer blade comprises a catch element at an end of the extension remote from the first coupler face, the catch element being at least one of shaped or sized to pass through the entry hole and not through the engagement slot.

E. The retention assembly of any one of example A through example D, wherein the retainer blade further comprises a stop element configured to engage an edge of the entry hole and prevent the extension from sliding farther into the engagement slot.

F. The retention assembly of any one of example A through example E, wherein the engagement surface associated with the second coupler face comprises a plurality of ribs configured to prevent a cable from sliding relative to the engagement surface.

G. The retention assembly of any one of example A through example F, wherein the retention coupler further comprises a projection extending from the second coupler face and having remote end coupled to the engagement surface, and wherein the projection defines a slot configured to receive a cable tie for coupling a cable to the retention coupler.

H. The retention assembly of any one of example A through example G, further comprising a cable-tie extending through the slot and configured to couple a cable to the retention coupler.

I. An example retention coupler for coupling a cable comprising a plurality of optical fibers to a support, the retention coupler comprising:

a retention support defining a first coupler face and a second coupler face opposite the first coupler face;

a retainer blade coupled to the first coupler face of the retention support via an extension, the retainer blade comprising a catch element at an end of the extension remote from the first coupler face, the catch element being shaped and sized to fit through an entry hole in a mounting plate; and an engagement surface associated with the second coupler face and configured to be adjacent a cable comprising a plurality of optical fibers, wherein the catch element of the retainer blade is configured to be passed through the entry hole, such that the extension extends through the entry hole, and wherein the extension is configured to slide within an engagement slot in the mounting plate extending from the entry hole, such that the retainer blade is adjacent a first face of the mounting plate and the first coupler face of the retention support is adjacent another face of the mounting plate opposite the first face of the mounting plate.

J. The retention coupler of example I, wherein the retention coupler comprises a latch member extending from the first coupler face and configured to engage a latch hole of the mounting plate.

K. The retention coupler of example I or example J, wherein the latch member defines a lateral surface configured to engage an edge of the latch hole and prevent the extension from sliding out of the engagement slot once the latch member is received in the latch hole.

L. The retention coupler of any one of example I through example K, wherein retainer blade comprises a catch element at an end of the extension remote from the first coupler face, the catch element being at least one of shaped or sized to pass through the entry hole and not through the engagement slot.

M. The retention coupler of any one of example I through example L, wherein the retainer blade further comprises a stop element configured to engage an edge of the entry hole and prevent the extension from sliding farther into the engagement slot.

N. The retention coupler of any one of example I through example M, wherein the engagement surface associated with the second coupler face comprises a plurality of ribs configured to prevent a cable from sliding relative to the engagement surface.

O. The retention coupler of any one of example I through example N, further comprising a projection extending from the second coupler face and having remote end coupled to the engagement surface, and wherein the projection defines a slot configured to receive a cable-tie for coupling a cable to the retention coupler.

P. An example method for coupling a cable comprising a plurality of optical fibers to a support, the method comprising:

coupling the cable to a retention coupler, the retention coupler comprising:

a retention support defining a first coupler face and a second coupler face opposite the first coupler face; and a retainer blade coupled to the first coupler face of the retention support via an extension, the retainer blade comprising a catch element at an end of the extension remote from the first coupler face, the catch element being shaped and sized to fit through an entry hole in a mounting plate;

passing the catch element through an entry hole in a mounting plate; and sliding the extension into an engagement slot in the mounting plate extending from the entry hole, such that the retainer blade is adjacent a first face of the mounting plate and the first coupler face of the retention support is adjacent another face of the mounting plate opposite the first face of the mounting plate.

Q. The method of example P, wherein coupling the cable to the retention coupler comprises:

passing a cable-tie through a slot in the retention coupler and around the cable; and cinching the cable-tie tightly around the cable.

R. The method of example P or example Q, wherein sliding the extension into the engagement slot in the mounting plate comprises sliding the extension into the engagement slot until a latch member extending from the first coupler face of the retention coupler engages a latch hole in the mounting plate.

S. The method of any one of example P through example R, wherein sliding the extension into the engagement slot in the mounting plate comprises sliding the extension into the engagement slot until a stop element associated with the retainer blade engages an edge of the entry hole and prevents the extension from sliding farther into the engagement slot.

T. The method of any one of example P through example S, further comprising coupling the mounting plate to a support.

What is claimed is:

1. A retention assembly for coupling a cable comprising a plurality of optical fibers to a support, the retention assembly comprising:
   a retention anchor configured to be coupled to a support, the retention anchor comprising:
      a mounting plate configured to be coupled to a support, the mounting plate defining:
         a first face;
         a second face opposite the first face;
         an entry hole extending through the mounting plate from the first face to the second face;
         a latch hole; and
         an engagement slot extending from a periphery of the entry hole; and
   a retention coupler configured to be coupled to a cable comprising a plurality of optical fibers, the retention coupler comprising:
      a retention support defining a first coupler face and a second coupler face opposite the first coupler face;
      a retainer blade coupled to the first coupler face of the retention support via an extension;
      an engagement surface associated with the second coupler face and configured to be adjacent a cable comprising a plurality of optical fibers, and
      a latch member extending from the first coupler face and configured to engage the latch hole of the mounting plate,
   wherein the retainer blade is configured to be passed through the entry hole, such that the extension extends through the entry hole from the first face to the second face of the mounting plate,
   wherein the extension is configured to slide within the engagement slot of the mounting plate, such that the retainer blade is adjacent the second face of the mounting plate and the first coupler face of the retention support is adjacent the first face of the mounting plate,
   wherein the latch member defines a lateral surface configured to engage an edge of the latch hole and prevent the extension from sliding out of the engagement slot once the latch member is received in the latch hole, and
   wherein the retention support is configured to be flexed, such that the latch member is disengaged from the latch hole allowing the extension to slide within the engagement slot.

2. The retention assembly of claim 1, wherein retainer blade comprises a catch element at an end of the extension remote from the first coupler face, the catch element being at least one of shaped or sized to pass through the entry hole and not through the engagement slot.

3. The retention assembly of claim 2, wherein the retainer blade further comprises a stop element configured to engage an edge of the entry hole and prevent the extension from sliding farther into the engagement slot.

4. The retention assembly of claim 1, wherein the engagement surface associated with the second coupler face comprises a plurality of ribs configured to prevent a cable from sliding relative to the engagement surface.

5. The retention assembly of claim 1, wherein the retention coupler further comprises a projection extending from the second coupler face and having remote end coupled to the engagement surface, and wherein the projection defines a slot configured to receive a cable-tie for coupling a cable to the retention coupler.

6. The retention assembly of claim 5, further comprising a cable-tie extending through the slot and configured to couple a cable to the retention coupler.

7. The retention assembly of claim 1, wherein the retention coupler further comprises a grip element extending from the second coupler face opposite the latch member, and wherein pulling or pivoting the grip element causes flexion of the retention support.

* * * * *